UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 583,517, dated June 1, 1897.

Original application filed November 7, 1895, Serial No. 568,212. Divided and this application filed July 23, 1896. Serial No. 600,238. (No specimens.)

*To all whom it may concern:*

Be it known that I, JOHN H. STEVENS, a citizen of the United States, residing at the city of Newark, in the county of Essex and State of New Jersey, have invented certain new and useful Improvements in Pyroxylin Compounds, of which improvements the following is a specification.

This specification is a division of my original application filed November 7, 1895, Serial No. 568,212.

The various compositions to which the present invention relates are employed in the arts mainly as imitations of natural substances, and consist of soluble pyroxylin combined with or dissolved in other substances. Although the final or useful form of the different compounds of this class is generally that of a dried or solid material, the different processes of conversion into this final solid form involve, as is well understood, the employment of pyroxylin solutions or mixtures of varying consistency as to plasticity, stiffness, or fluidity, dependent generally upon the proportion and kind of solvent used to the amount of pyroxylin.

There are two classes of solvents—liquid solvents, of which wood-spirit is a good example, and solid solvents, of which camphor is a good representative. Solvent mixtures are also formed by combining two or more substances with each other. The components of the mixed solvent in such a case may not necessarily be possessed of individual solvent power. For instance, alcohol, which is practically a non-solvent in itself, forms a good solvent mixture when camphor is dissolved in it. The various applications of this important art require the employment of complex mixtures in the solvent, single substances being rarely used for such purposes. Hence, while the advancement of this art has, as is well known, depended largely on the discovery and application of new single solvent substances, yet it has required also the invention of combinations of solvents by which effects are produced quite different from those produced when single solvents are employed alone.

The action of solid solvents is quite distinct from that of liquid solvents in that the solid solvent, after the seasoning or drying of the material, remains a part of the finished product and gives the property of plasticity under heat, as is well understood. Although numerous solid solvents have been discovered and applied, camphor is still regarded as a solvent of great importance in this art, notwithstanding the difficulties attending its use. Hence special attention has been directed to so modifying the action of the camphor that its excellent solvent powers and other characteristics could be advantageously utilized.

The principal objection to the use of camphor is its high melting-point, which necessitates the use of so much heat in molding the thoroughly-dried compounds containing camphor that there is a tendency to discoloration. The difficulty has been met to a certain extent by leaving in the final product a small proportion of liquid solvent, such as alcohol, which lowers the melting-point of the camphor and permits the manipulation of the compound without destroying the good qualities of the material. There is such a wide difference, however, between the volatility of the camphor and the liquid menstruum or menstrua employed with it, that it is difficult to control the plastic properties of the compound by such means, because the relative proportion of the camphor to the liquid solvent varies according to the conditions of evaporation or seasoning.

It is the object of the present invention to form pyroxylin compounds in such a manner that their plasticity will be independent of the presence of liquids in the compounds. To accomplish this, I employ in conjunction with the camphor certain solid substances which I have discovered possess the power to form, with the camphor and pyroxylin, a compound which is plastic at lower temperatures than if they were omitted. These solid substances combine with the camphor to form a solid solvent—that is, a solid which when melted by means of heat dissolves pyroxylin. The members of this group of substances possess the common property of forming useful solvents in conjunction with camphor, but have varying individual characteristics which they impart to a certain extent to the pyroxylin compound.

The group to which I refer embraces the crystalline nitro derivatives of substances belonging to the aromatic series. The substances embraced in this group are nitronaphthalene and nitrophenol.

The combinations of nitric acid with naphthalene and phenol form nitro compounds which possess more or less direct solvent power on pyroxylin.

*Nitronaphthalene.*— Ordinary nitronaphthalene ($C_{10}H_7.NO_2$) is a good representative of the nitronaphthalenes. Nitronaphthalene is generally of a yellowish cast of color and it must be employed in mixtures where this property is unobjectionable. When heated, it is a solvent of pyroxylin.

*Nitrophenol.*—There are a number of nitrophenols, of which I recommend mononitrophenol ($C_6H_5NO_3$) for general use.

The nitronaphthalenes and nitrophenols possess more or less color, and I employ them in pyroxylin compounds where that property is unobjectionable—that is, in compounds having tints and colors, such as browns, greens, reds, yellows, russet, buff, black, &c.

For additional information as to the state of the art and the various manipulations to which pyroxylin compounds are subjected I refer to my United States Patents No. 517,987, dated April 10, 1894, No. 543,692, dated July 16, 1895, and No. 542,197, dated July 23, 1895.

A mixture of camphor with any one member or combinations of different members of the group enumerated (with or without the addition of other solid solvents) can be employed in manufacturing pyroxylin compounds, and such mixtures should be used in the same proportions that are employed when camphor alone is used as the solid solvent.

As to the proportions of the components of the mixed solvents to be used the substances which are solvents in themselves can be used in larger proportions relatively to the camphor than those which are non-solvents, but I have found, practically, that satisfactory results are obtained by employing three or four parts of camphor to one part of any one member or to one part of a mixture of two or more of the members of the group of substances, although these proportions may be varied. Some of these substances are of difficult solubility in the ordinary liquid menstrua employed in this art, but I have found that when mixed with camphor in the proportions given they are sufficiently soluble for practical work.

It will be evident to the experienced operator in this art that as the plasticity of the seasoned pyroxylin compound made with these new solvents depends upon the solvent power of the camphor when acting in conjunction with one or more members of the specified group of new substances any heating of these compounds when in a dry or seasoned condition, even in the presence of liquid solvents, (the liquid solvent being insufficient in itself to give the desired plasticity to the compound,) is a use of the solvents of this invention. It is also true that regardless of the process used or in what order the ingredients are mixed the presence at any time of my new solvents in the compound imparts properties to such compound which it would not otherwise possess and involves a utilization of my invention. I do not confine myself, therefore, to the use of any particular proportions of the substances embraced in the group of my new solvents, nor to any particular method in which they are used in pyroxylin compounds.

The result of my mixtures is either a fluid solution or a plastic mass, either of which, when properly applied, manipulated, or formed into shape and then dried by allowing the liquid solvent to evaporate, becomes a hard pyroxylin compound capable of being softened or formed into new shapes by the aid of heat and pressure in the customary manner.

By the application of heat or heat and pressure to the manipulation of these compounds I mean such operations as are commonly used in this art to mold or shape the seasoned or partly-seasoned product, whether it be by shaping in hot water, or forcing under heat through stuffing machinery, or molding in heated dies, or manipulating in heated rolls, or any analogous method.

Having thus described my invention, what I claim, and desire to secure by Letters Patent, is—

1. The process of manufacturing pyroxylin compounds which consists in combining pyroxylin, camphor and one or more members of the hereinbefore-specified new group (consisting of the crystalline nitro derivatives of naphthalene and the crystalline nitro derivatives of phenol), and subjecting the mixture to heat and pressure sufficient to render the compound plastic, substantially as described.

2. The process of manufacturing pyroxylin compounds which consists in mixing pyroxylin, camphor, one or more members of the hereinbefore-specified new group (consisting of the crystalline nitro derivatives of naphthalene and the crystalline nitro derivatives of phenol) and a liquid menstruum or liquid menstrua, and subjecting the mixture to heat and pressure sufficient to render the compound plastic, substantially as described.

3. A new composition of matter consisting of pyroxylin, camphor and one or more of the hereinbefore-specified new group (consisting of the crystalline nitro derivatives of naphthalene and the crystalline nitro derivatives of phenol) substantially as described.

4. The process of manufacturing pyroxylin compounds which consists in intimately mixing pyroxylin, camphor, one or more members of the hereinbefore-specified new group (consisting of the crystalline nitro derivatives of naphthalene and the crystalline nitro derivatives of phenol) and a liquid menstruum or liquid menstrua sufficient in amount to convert the entire mixture into a pyroxylin solution, or compound, substantially as described.

5. As a new composition of matter, a compound of pyroxylin containing pyroxylin, camphor, one or more members of the hereinbefore-specified new group (consisting of the crystalline nitro derivatives of naphthalene and the crystalline nitro derivatives of phenol) and a liquid menstruum or liquid menstrua, substantially as described.

In witness whereof I have hereunto signed my name this 29th day of June, 1896.

JOHN H. STEVENS.

In presence of—
ABRAHAM MANNERS,
HORACE S. MILLER.